United States Patent
Park et al.

(10) Patent No.: US 12,409,947 B2
(45) Date of Patent: Sep. 9, 2025

(54) SYSTEM AND METHOD FOR DETECTING AIRCRAFT ENERGY ANOMALY USING NEURAL NETWORK MODEL

(71) Applicant: ELECTRONICS AND TELECOMMUNICATIONS RESEARCH INSTITUTE, Daejeon (KR)

(72) Inventors: Noh-Sam Park, Daejeon (KR); Ji Yeon Kim, Daejeon (KR); Jong Hyun Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 210 days.

(21) Appl. No.: 18/349,321

(22) Filed: Jul. 10, 2023

(65) Prior Publication Data
US 2024/0101272 A1 Mar. 28, 2024

(30) Foreign Application Priority Data

Sep. 22, 2022 (KR) .................. 10-2022-0119982
Apr. 27, 2023 (KR) .................. 10-2023-0055295

(51) Int. Cl.
*B64D 45/00* (2006.01)
*G06N 3/0455* (2023.01)
(Continued)

(52) U.S. Cl.
CPC ........... *B64D 45/00* (2013.01); *G06N 3/0455* (2023.01); *G08G 5/54* (2025.01); *B64D 2045/0085* (2013.01)

(58) Field of Classification Search
CPC ............ B64D 45/00; B64D 2045/0455; G06N 3/0455; G06N 3/08; G08G 5/54; G08G 5/003
See application file for complete search history.

(56) References Cited

U.S. PATENT DOCUMENTS 9,729,305 B2 8/2017 Shin et al.
10,908,277 B1 * 2/2021 Roggendorf .......... G01S 13/953
(Continued)

FOREIGN PATENT DOCUMENTS

JP          5209615 B2    6/2013
KR   10-2021-0153784 A   12/2021
KR   10-2022-0060426 A    5/2022

OTHER PUBLICATIONS

Noh-Sam Park et al., "Anomaly Detection Analysis for Go-Around Events Using ADS-B Trajectory Data". 2021 KICS Summer Conference, Jun. 2021.
(Continued)

*Primary Examiner* — Tan Q Nguyen
(74) *Attorney, Agent, or Firm* — Rabin & Berdo, P.C.

(57) ABSTRACT

The present disclosure relates to a system and method for detecting an aircraft energy anomaly using an artificial neural network learning model. A system for detecting an aircraft energy anomaly using an artificial neural network learning model according to the present disclosure includes an input interface device for receiving ADS-B (Automatic Dependent Surveillance-Broadcast) data, a memory storing a program which generates a specific energy feature for energy state analysis by extending the ADS-B data through a preprocessing, and a processor for executing the program, wherein the processor generates an energy distribution model by the use of the specific energy feature, and performs artificial neural network-based energy anomaly learning.

14 Claims, 9 Drawing Sheets

(51) Int. Cl.
  *G08G 5/54*    (2025.01)
  *G06N 3/08*    (2023.01)

(56) References Cited

U.S. PATENT DOCUMENTS

| | | | |
|---|---|---|---|
| 2013/0198119 A1* | 8/2013 | Eberhardt, III | G06N 20/00 706/12 |
| 2014/0245454 A1 | 8/2014 | Lee et al. | |
| 2019/0042748 A1* | 2/2019 | Shabtai | G06N 3/044 |
| 2019/0354644 A1* | 11/2019 | Orhan | G06N 3/044 |
| 2021/0020056 A1* | 1/2021 | Chenchu | G08G 5/21 |

OTHER PUBLICATIONS

Noh-Sam Park et al., "Anomaly Detection Based on Energy State Analysis during Aircraft Approach Phase Using ADS-B Trajectory Data". 2022 KICS Summer Conference, Jun. 2022.

* cited by examiner

| CLASSIFICATION | Data | Description | Units |
|---|---|---|---|
| Key | Id | AIRCRAFT UNIQUE ID | |
| | Callsign | CALLSIGN | |
| | Type | AIRCRAFT TYPE | |
| Time | time | YEAR MONTH DAY HOUR MINUTE SECOND | YYYY-MM-DD HH:mm:ss |
| Key | Callsign | CALLSIGN | |
| | Origin | DEPARTURE AIRPORT | |
| | Destination | ARRIVAL AIRPORT | |
| | Flight Type | AIRCRAFT TYPE | |
| | Runway | RUNWAY | |
| Trajectory | Latitude | LATITUDE | deg(-90~90) |
| | Longitude | LONGITUDE | deg(-180~180) |
| | Altitude | ALTITUDE | ft (Mean Sea Level) |
| | Vertical Rate | VERTICAL RATE | fpm (ft/min) |
| | Groundspeed | GROUND SPEED | knot |
| | Course | AZIMUTH | deg(0~360) |
| Weather | windspeed | 10-MINUTE AVERAGE WIND DIRECTION | deg(0~360) |
| | winddirection | 10-MINUTE AVERAGE WIND SPEED | kts |
| | Wind_Head_Tail | HEADWIND/TAILWIND STRENGTH | kts |
| | Cross_wind_direction | CROSS WIND DIRECTION | L, R |
| | cross_abs | CROSS WIND STRENGTH | kts |
| Energy | Specific Energy | SPECIFIC ENERGY | feet |
| Alert | High Energy | HIGH ENERGY ANOMALY PRESENCE OR ABSENCE | 0, 1 |
| | Low Energy | LOW ENERGY ANOMALY PRESENCE OR ABSENCE | 0, 1 |

FIG. 4

| Time | Callsign | Origin | Destination | FlightType | Runway | Latitude | Longitude | Altitude | VerticalRate | GroundSpeed | Course |
|---|---|---|---|---|---|---|---|---|---|---|---|
| 2019-01-01 18:23 | PAL468 | RPLL | RKSI | A332 | 33R | 32.92177 | 126.76624 | 39000 |  | 391 | 334 |
| 2019-01-01 18:23 | PAL468 | RPLL | RKSI | A332 | 33R | 32.97072 | 126.73766 | 39000 |  | 394 | 334 |
| 2019-01-01 18:24 | PAL468 | RPLL | RKSI | A332 | 33R | 33.02303 | 126.70692 | 39000 |  | 394 | 334 |
| 2019-01-01 18:24 | PAL468 | RPLL | RKSI | A332 | 33R | 33.06945 | 126.67931 | 39000 |  | 395 | 333 |
| 2019-01-01 18:25 | PAL468 | RPLL | RKSI | A332 | 33R | 33.10027 | 126.66166 | 39000 |  | 404 | 337 |
| 2019-01-01 18:25 | PAL468 | RPLL | RKSI | A332 | 33R | 33.133 | 126.64927 | 39000 | -83 | 427 | 346 |
| 2019-01-01 18:26 | PAL468 | RPLL | RKSI | A332 | 33R | 33.21011 | 126.63973 | 38925 | -448 | 444 | 356 |
| 2019-01-01 18:26 | PAL468 | RPLL | RKSI | A332 | 33R | 33.26865 | 126.63531 | 38500 | -900 | 435 | 357 |
| 2019-01-01 18:26 | PAL468 | RPLL | RKSI | A332 | 33R | 33.31097 | 126.63481 | 38175 | -1020 | 443 | 1 |

FIG. 5

| windspeed | winddirection | wind_head_tail | cross_direction | cross_wind | specific_Energy | High Energy | Low Energy | distance_class |
|---|---|---|---|---|---|---|---|---|
| 15.5 | 320 | 15.03958376 | L | 3.74978938 | 39001.00886 | 1 | 0 | 19.5 |
| 15.2 | 320 | 14.74849504 | L | 3.67721281 | 39001.01273 | 0 | 0 | 18.5 |
| 15.2 | 320 | 14.74849504 | L | 3.67721281 | 39001.01273 | 0 | 1 | 17.5 |
| 15 | 320 | 14.61555097 | L | 3.37426582 | 39001.01401 | 0 | 0 | 16.5 |
| 15 | 320 | 14.34457134 | L | 4.38557557 | 39001.0255 | 0 | 0 | 15.5 |
| 15 | 320 | 13.48191069 | L | 6.57755672 | 39001.05428 | 0 | 0 | 14.5 |
| 15 | 320 | 12.13525492 | L | 8.81677878 | 38926.07507 | 0 | 0 | 13.5 |
| 14.9 | 320 | 11.8996691 | L | 8.96704385 | 38501.06411 | 0 | 0 | 12.0 |
| 14.9 | 320 | 11.24517275 | L | 9.77527953 | 38176.07386 | 0 | 0 | 10.5 |

SYSTEM AND METHOD FOR DETECTING AIRCRAFT ENERGY ANOMALY USING NEURAL NETWORK MODEL

CROSS-REFERENCE TO RELATED APPLICATION

This application claims priority to and the benefit of Korean Patent Application Nos. 10-2022-0119982, Sep. 22, 2022, and 10-2023-0055295, Apr. 27, 2023, the disclosure of which is incorporated herein by reference in its entirety.

BACKGROUND

1. Technical Field

The present disclosure relates to a system and method for detecting an aircraft energy anomaly using an artificial neural network learning model.

2. Related Art

According to the prior art, a high-energy approach monitoring system has been proposed as a system for managing and monitoring the energy state of an aircraft, but this monitoring method has a problem in that an expensive separate system is required.

SUMMARY

The present disclosure has been proposed to address the above-described drawbacks, and an object of the present disclosure is to provide a system and method which, by extending automatic dependent surveillance-broadcast (ADS-B), that is track data, generate an additional feature for energy state analysis, analyze an energy state by the use of a deep learning model, and provide the result of detecting an energy anomaly.

A system for detecting an aircraft energy anomaly using an artificial neural network learning model according to the present disclosure includes an input interface device for receiving ADS-B (Automatic Dependent Surveillance-Broadcast) data, a memory storing a program which generates a specific energy feature for energy state analysis by extending the ADS-B data through a preprocessing, and a processor for executing the program, wherein the processor generates an energy distribution model by the use of the specific energy feature, and performs artificial neural network-based energy anomaly learning.

The processor extracts the specific energy feature by the use of location information and motion information of the ADS-B data, and generates the energy distribution model.

The processor manages energy distribution data for each arrival airport runway.

The processor predicts an arrival runway by the use of runway heading information and latitude and longitude information of the runway threshold of the arrival airport.

The processor predicts whether an aircraft energy anomaly exists in real time by the use of a trained learning model and test data.

The processor calculates a specific energy value at a certain point in the ADS-B data of a flight which has arrived at a corresponding runway, for the remaining distance to the runway to generate a quantile value, and determines the energy state of a certain flight by comparing the quantile value with a quantile model of the runway of an arrival airport.

The processor analyzes an energy state at a point of the ADS-B data, which is time series data, and utilizes the analysis result as an input of a long short-term memory (LSTM) to predict an energy state at a next time point.

A method for detecting an aircraft energy anomaly using an artificial neural network learning model according to the present disclosure includes (a) generating a specific energy feature for energy state analysis by extending ADS-B data; and (b) generating an energy distribution model by the use of the specific energy feature, and performing artificial neural network-based energy anomaly learning.

The step (a) includes extracting the specific energy feature by the use of location information and motion information of the ADS-B data.

The step (a) includes managing energy distribution data for each arrival airport runway.

The step (a) includes predicting an arrival runway by the use of runway heading information and latitude and longitude information of the runway threshold of the arrival airport.

The step (b) includes learning energy data for each distance class of the runway, wherein time-series energy anomaly learning is performed by the use of the autoencoder learning result for each distance class to the runway as an input to an LSTM model.

The method for detecting an aircraft energy anomaly using an artificial neural network learning model according to the present disclosure further includes (c) predicting whether or not there is an aircraft energy anomaly in real time by the use of test data and a learning model which has been trained and distributed in the step (b).

The step (c) includes predicting an energy anomaly by the use of a hybrid model in which an autoencoder and an LSTM are combined.

According to the prior art, an expensive flight analysis system such as an existing Flight Data Recorder (FDR) had to be used to detect an aircraft energy anomaly, whereas according to the present disclosure, it is possible to determine the presence or absence of the anomaly by the use of only ADS-B track data, thereby achieving the effect of extracting energy anomaly detection results with low cost and high efficiency.

According to the present disclosure, while exceeding the aviation risk management in the dimension of the post management through rule-based detection results using the existing IQR (Interquantile Range) technique, by predicting the presence or absence of an aircraft energy anomaly in real time by the use of AI technology using artificial neural networks, it can be utilized to construct a preventive aviation safety management system.

According to the present disclosure, by applying a hybrid method in which an outlier detection model for extracting a feature from each data point and restoring the result is combined with a recurrent neural network learning model for prediction of time series data, scalability is excellent and efficient calculation is possible.

According to the present disclosure, by generating ground truth for high-energy and low-energy data based on the energy distribution model, improving the performance of outlier detection by utilizing it, and providing the importance of extended features for the outlier detection prediction result, it has the effect of assisting analysts in understanding the results and outputs of the learning model.

The effects of the present disclosure are not limited to those mentioned above, and other unmentioned effects will be clearly understood by those skilled in the art from the description below.

DETAILED DESCRIPTION

Above-described objects and other objects, and advantages and characteristics of the present disclosure, and methods of achieving them will become apparent with reference to the embodiments described below in detail in conjunction with the accompanying drawings.

However, the present disclosure is not limited to the embodiments disclosed below, but will be implemented in a variety of different forms, and the following embodiments are merely provided to easily inform those skilled in the art of the purpose, configuration and effects of the disclosure, and the scope of the patent right of the present disclosure is defined by the description of the claims.

Meanwhile, as used herein, the terms are for the purpose of describing the embodiments, and are not intended to limit the present disclosure. Herein, terms in the singular form also relate to the plural form unless specifically stated otherwise in the context. As used herein, the term(s) "comprises" and/or "comprising" specify/specifies the presence of stated components, steps, operations, and/or elements, but do/does not preclude the presence or addition of at least one other component, step, operation, and/or element.

ADS-B (Automatic Dependent Surveillance-Broadcast) is a system which transmits aircraft information to an air traffic control system and other aircrafts at regular intervals by the use of a satellite navigation system. By utilizing the ADS-B, it is possible to perform aerial surveillance at a low cost compared to radar, which is an existing technology, and there is an advantage of providing relatively accurate location values considering the GPS latitude and longitude location and aircraft size.

In order to prevent aviation safety accidents in advance through the collection/analysis of aviation safety data and information, including ADS-B data, it is necessary to analyze flight stages at which aviation risks occur at high frequency, and obstructive factors. Recently, in the aviation safety field, a range of researches are under progress to establish an effective and efficient safety management system by predicting aviation safety risk events by the use of AI techniques.

Examples of aviation safety applications through AI include weather condition prediction, landing safety management using an aircraft arresting system, intelligent air traffic management (ATM), and the like. To this end, it is necessary to develop technology for detecting hazards and predicting aviation risk by applying AI techniques to ADS-B data, which is track data.

An unstable approach refers to an approach that does not meet the stable approach criteria defined in the airline's standard operating procedures. There are various factors that cause unstable approaches, wherein one factor is that the energy of the aircraft is too high or too low during the approach stage. These high-energy and low-energy states may be caused by excessive descent rates and airspeeds, improper flare and thrust, and may cause accidents/quasi-accidents during the approach-landing stage.

Various tools and techniques are utilized to efficiently manage and monitor energy state, so that energy state anomalies can be detected and returned to normal energy state. A high energy approach monitoring system is used to predict such anomalies in the energy state. The energy predicted by the system is compared with a pre-specified energy threshold to generate a high energy/low energy alarm. The alarm message contains information about a glide slope, an aircraft speed, an altitude, and the like. However, this monitoring method has a drawback in that a separate high-cost system is required, and so, it is necessary to perform aviation risk prediction analysis by determining the presence or absence of an anomaly in the energy state only with ADS-B data without using any separate high-cost system.

According to an embodiment of the present disclosure, a system and method for detecting an aircraft energy anomaly and an aircraft safety risk factor using an artificial neural network learning model are proposed.

To this end, by extending the specific energy feature through a preprocessing process, generating aircraft energy distribution data, and performing the training by the use of an artificial neural network with the aircraft energy distribution data as an input at a certain distance before the arrival of the aircraft, a model for determining the high energy and low energy of the aircraft is generated.

According to an embodiment of the present disclosure, in order to detect outliers in time series data, the learning is performed by combining an autoencoder outlier detection model and LSTM, which is a time series learning model.

The trained learning model predicts the presence or absence of an energy anomaly by the use of the test data, and identifies the association of the presence and absence of an energy anomaly through the feature importance result.

Figure 1:
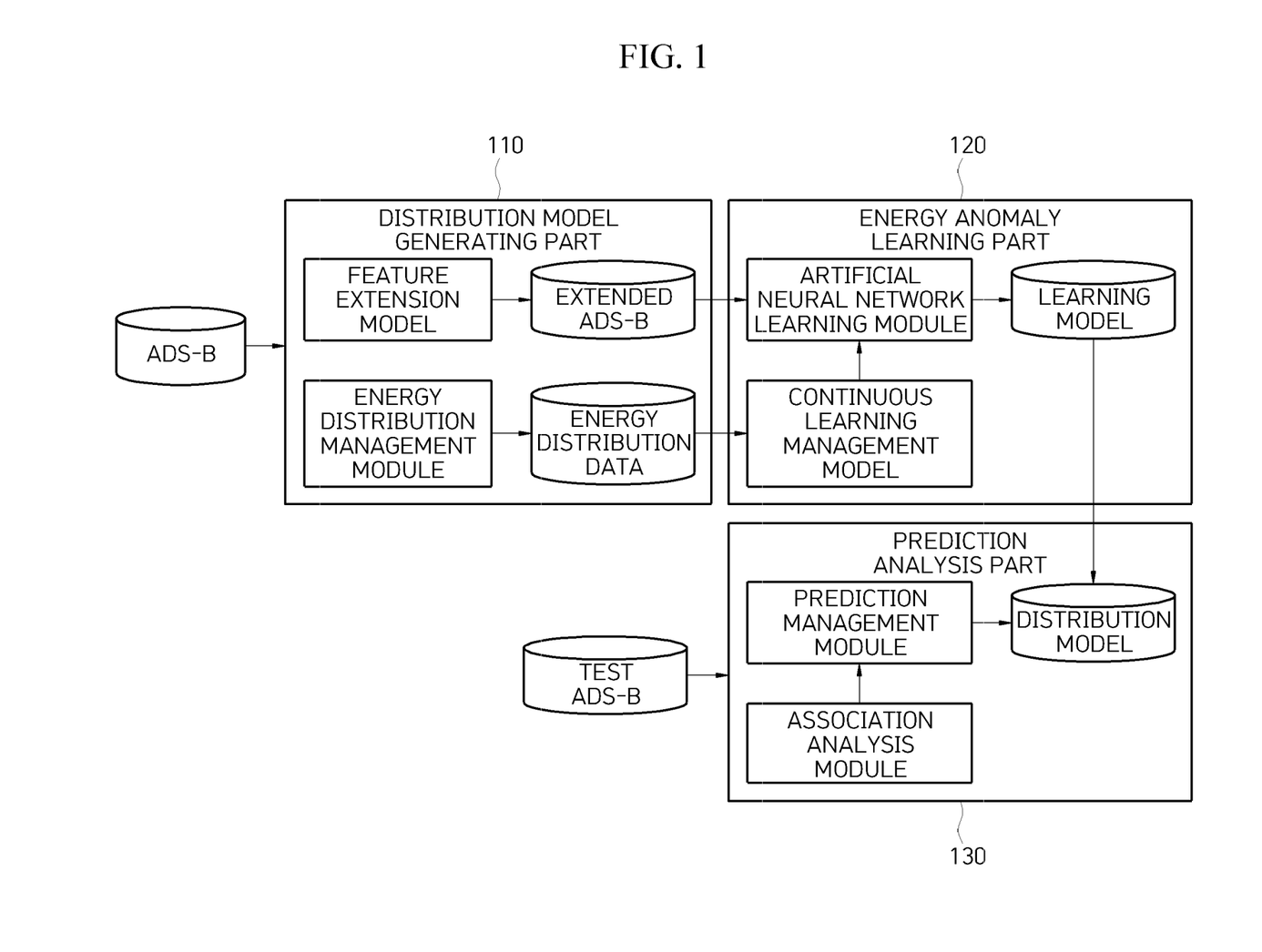
FIG. 1 shows an aircraft energy anomaly detection system using an artificial neural network learning model according to an embodiment of the present disclosure.

FIG. 1 shows an aircraft energy anomaly detection system using an artificial neural network learning model according to an embodiment of the present disclosure.

The aircraft energy anomaly detection system using an artificial neural network learning model according to an embodiment of the present disclosure includes a distribution model generating part 110 which extracts a specific energy feature using the ADS-B data and generates an energy distribution model, an energy anomaly learning part 120 which performs artificial neural network-based energy anomaly learning by the use of input data, and a prediction analysis part 130 which predicts whether an aircraft energy anomaly exists using a trained learning model.

The distribution model generating part 110 receives ADS-B (i.e., aircraft track data) as an input, extends features required for energy anomaly detection, and generates an energy distribution model.

The distribution model generating part 110 extracts a specific energy feature by the use of location information (latitude and longitude) and motion information (velocity) of the ADS-B data, which is aircraft track data, and generates the energy distribution model.

The distribution model generating part 110 manages energy distribution data for each arrival airport runway.

The energy anomaly learning part 120 performs learning by the use of a feature-extended dataset and an artificial neural network.

The prediction analysis part 130 predicts whether an aircraft energy anomaly exists in real time by the use of the trained learning model and test data.

The distribution model generating part 110 calculates the specific energy as shown in [Equation 1] below by the use of the potential energy and kinetic energy of the ADS-B data, and computes distribution values for specific energy values for each runway of an airport.

$$E = h + \frac{v^2}{2g} \qquad \text{[Equation 1]}$$

where h denotes the altitude, v denotes the velocity, and g denotes the gravitational acceleration.

The accuracy of the energy analysis model is affected by the size of the ADS-B sample data of a flight arriving at each airport runway. Additionally, it is necessary to utilize data of a certain period of time (e.g., one year) or longer in view of variations depending on changes in weather conditions.

A quantile is generated by calculating the specific energy value at a certain point of the ADS-B data of all flights which have arrived at the corresponding runway, every 0.5 nautical mile (NM) remaining distance to the runway up to 20 NM remaining distance to the runway.

In order to determine the energy state of a certain flight, the prediction analysis part 130 compares it with the quantile model of the runway of the arrival airport.

As a method for determining high energy and low energy, an interquantile range (IQR) is used. The IQR represents the difference between the Q3(75%) and Q1(25%) quantiles, and the high energy is determined based on being above Q3+1.5*IQR, while the low energy is determined based on being below Q1−1.5*IQR. When the corresponding standard is violated for a predetermined period of time or longer (e.g., 30 seconds or more) at the final approach stage of a certain flight, it is classified as high energy or low energy, respectively.

Figure 2:
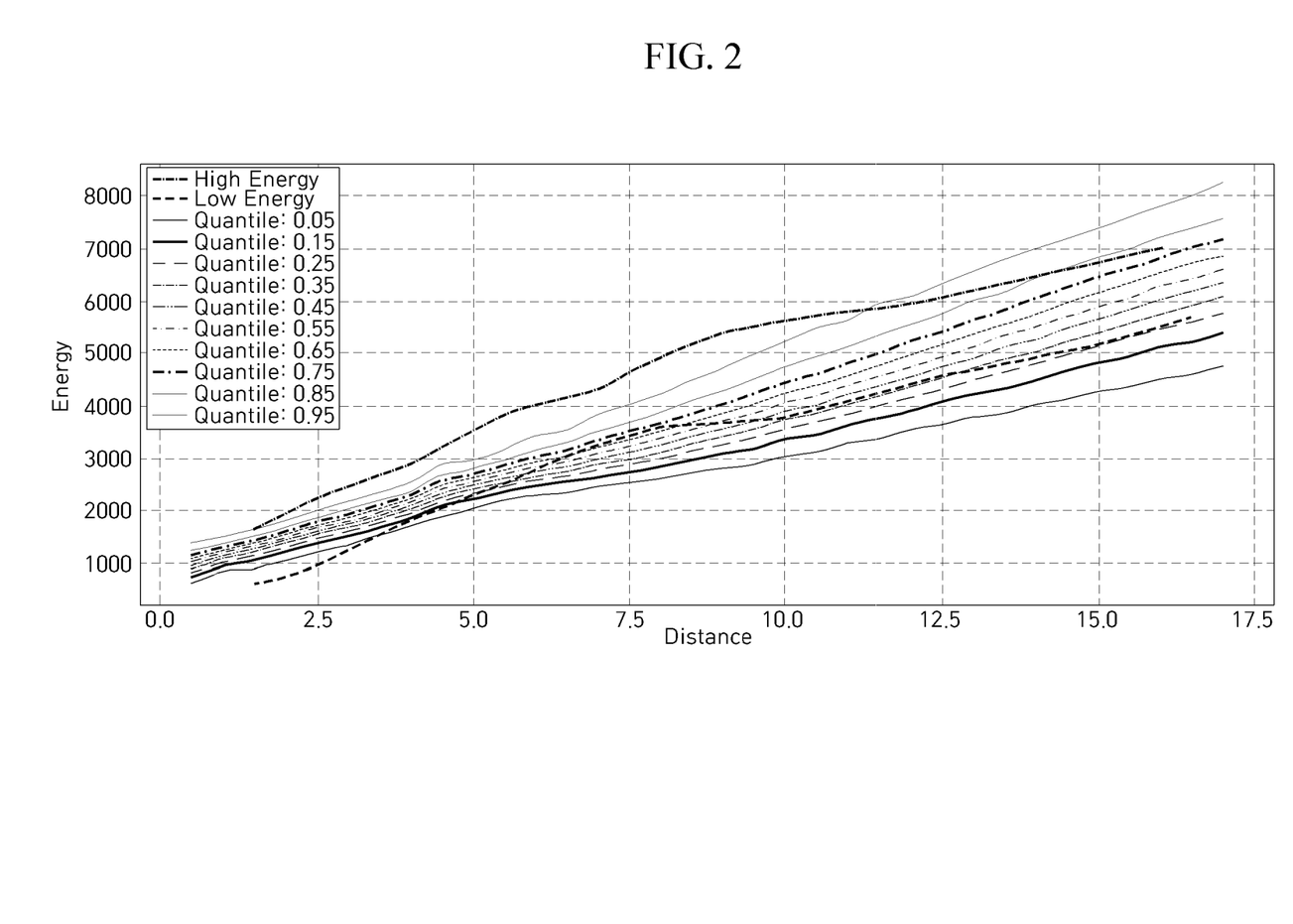
FIG. 2 shows visualization of energy distribution generation results according to an embodiment of the present disclosure.

FIG. 2 shows visualization of energy distribution generation results according to an embodiment of the present disclosure.

FIG. 2 is an example of the energy distribution generation result, showing, in quantiles, the energy state distribution of flights which arrived at Incheon International Airport Runway 16L in 2019.

The X-axis represents the distance to the arrival airport, and the Y-axis represents the distribution value from 5% to 95% of aircraft energy in each distance section. The lines representing High Energy and Low Energy in FIG. 2 are ones among energy values of flights arrived at Runway 16L, which are detected as high energy/low energy when using the IQR method. In the case of the High Energy flight of FIG. 2, it can be seen that the energy value is continuously high from around 8 miles before arrival on the runway, and that in the case of the Low Energy flight, it deviates from the distribution value at around 2.5 miles.

Figure 3:
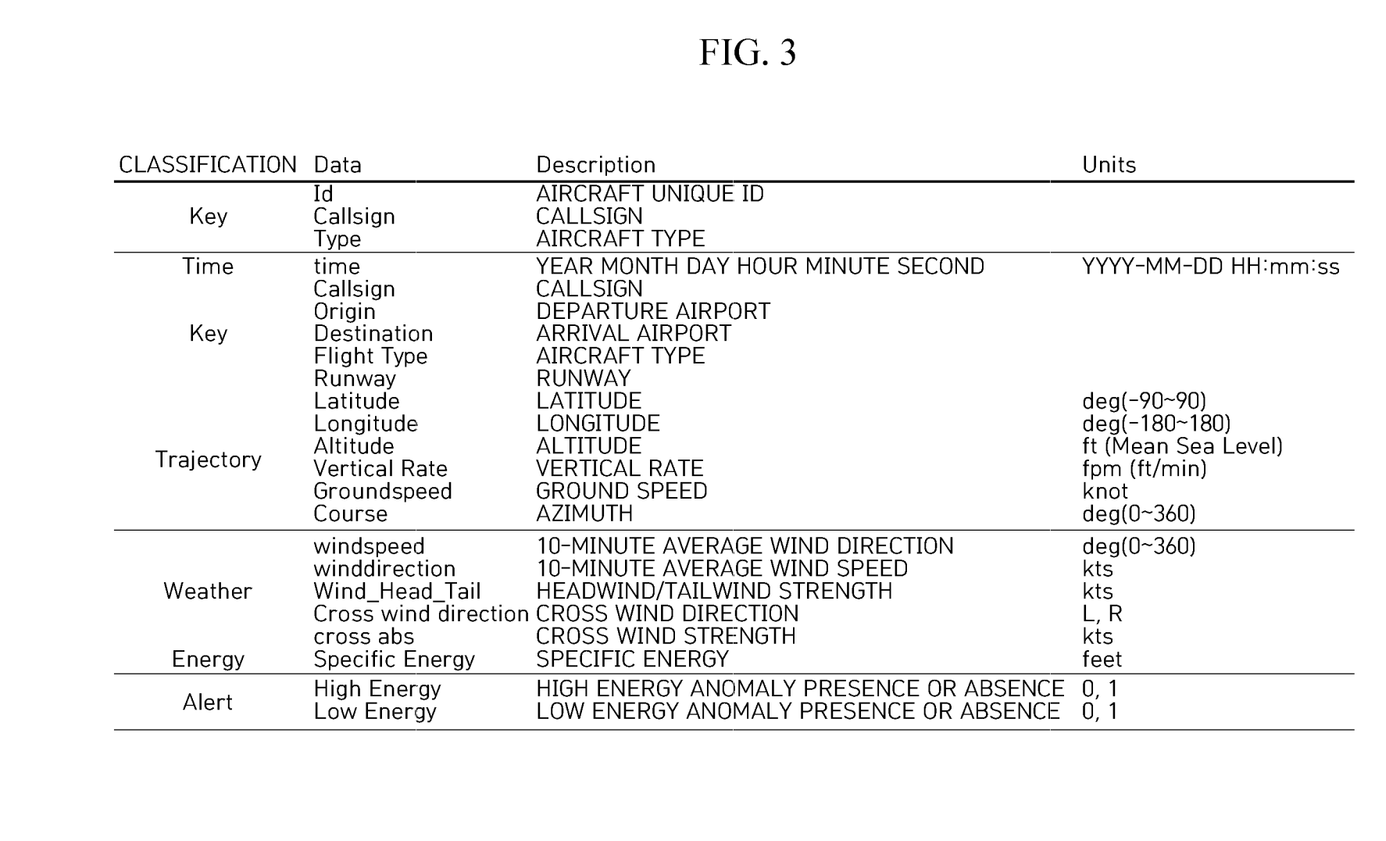
FIGS. 3 to 5 show ADS-B and feature extension data for detecting an aeronautical energy anomaly according to an embodiment of the present disclosure.
Figure 4:
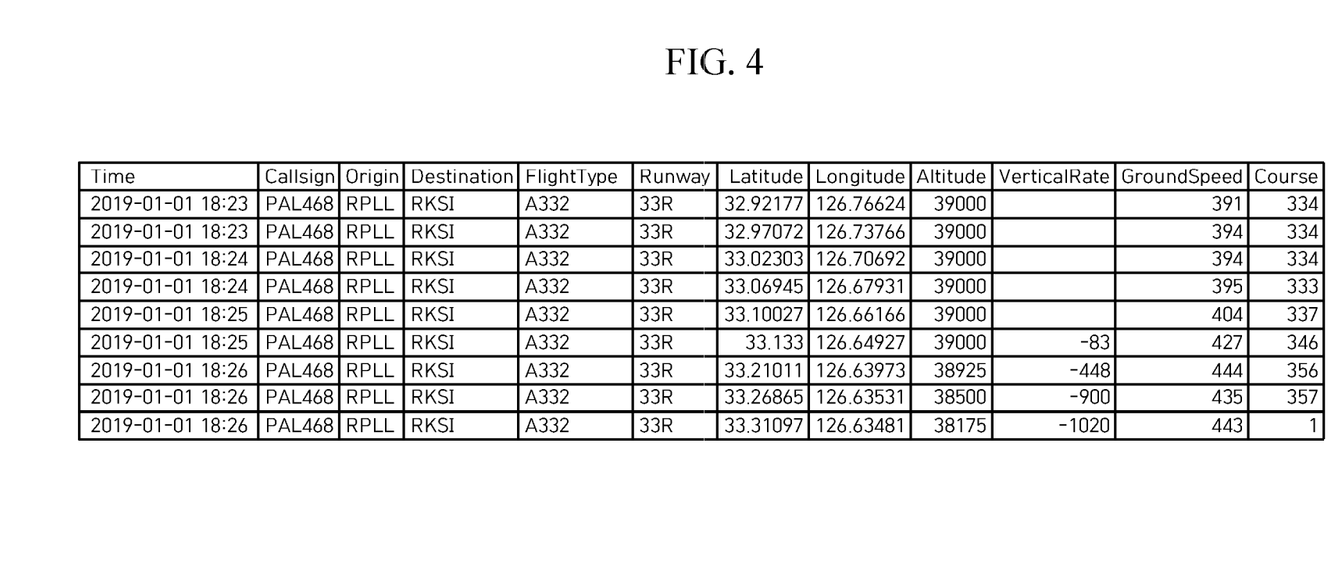
Figure 5:
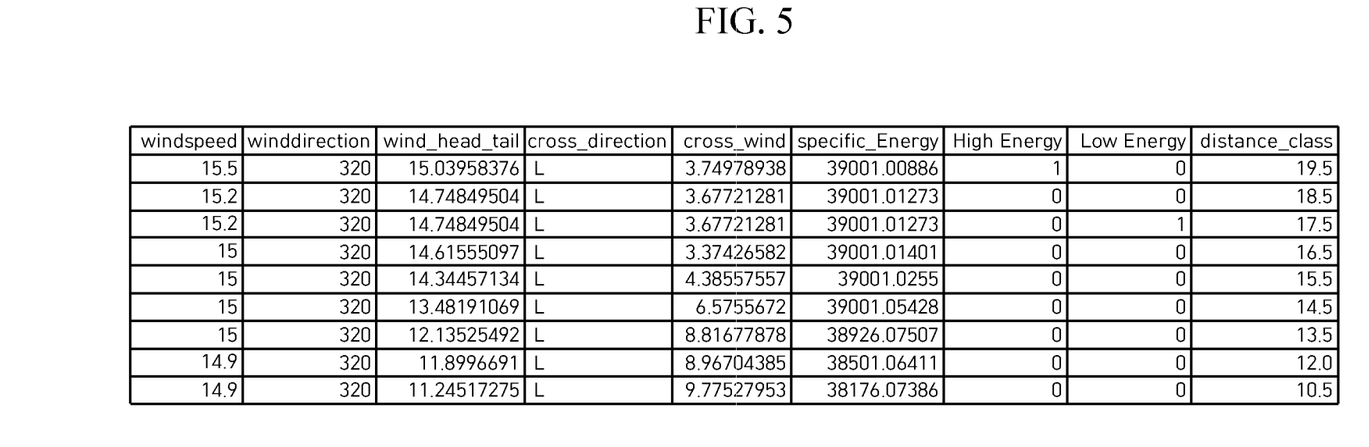

FIGS. 3 to 5 show ADS-B and feature extension data for detecting an aeronautical energy anomaly according to an embodiment of the present disclosure. FIG. 3 shows ADS-B data definitions, FIG. 4 shows an example of ADS-B data (original data), and FIG. 5 shows an example of added (extended) feature data.

It is necessary to extend the original ADS-B data in order to determine whether an energy anomaly exists, and identify the causes affecting the energy anomaly. FIG. 3 shows the details of ADS-B data and extended features. ADS-B data is time series data received at certain intervals from departure to arrival of an aircraft, and the original data itself includes aircraft information (call sign, aircraft type, etc.), time information, track information (position, speed, azimuth, etc.), and departure and arrival information (airport, runway, distance to runway).

The energy state analysis results in different energy distributions for each specific runway at the airport where the aircraft arrives. Therefore, whether or not there is an energy anomaly is determined at every remaining distance class for each runway. For this purpose, arrival runway information not found in the ADS-B data is required, and this information is predicted by the use of an algorithm.

For the runway prediction, latitude and longitude information and runway headings of all runway thresholds of the arrival airport are required. For example, the latitude and longitude of the threshold of Runway 15L at Incheon International Airport are 37.4839 and 126.4401, and the heading thereof is 144.66 degrees. The ADS-B data includes latitude and longitude and course information of the aircraft, and it is possible to calculate the heading angle difference and the distance between two points by the use of the latitudes and longitudes.

Data selection for the runway prediction selects data of the latest time at a height of or above a certain threshold from among the ADS-B data. That is, the closest runway is searched for by selecting data closest to the arrival time point at the height of or above a certain level.

The followings are calculated for the selected data and all the runways of the arrival airport: i) the distance to the runway, and ii) the heading angle difference. The target runway with the closest distance to the runway is primarily predicted as the runway, and if there are multiple target runways, each of which has the corresponding distance to the runway within the threshold value, the runway with the smallest heading angle difference is predicted as the final runway.

According to an embodiment of the present disclosure, the specific energy information is generated to analyze the energy state, and for association analysis, weather information (wind direction, wind speed, headwind/tailwind/cross wind, etc.) around the airport, which is external data, is extended to match the information of the corresponding time in ADS-B.

According to an embodiment of the present disclosure, it is possible to determine the presence or absence of high energy and low energy anomalies by the use of the IQR technique, and the corresponding information is used as a dataset (Ground Truth) for supervised learning. The presence or absence of high-energy and low-energy anomalies means the presence or absence of an energy anomaly in a specific distance class to the arrival airport at a time point of the ADS-B data.

Figure 6:
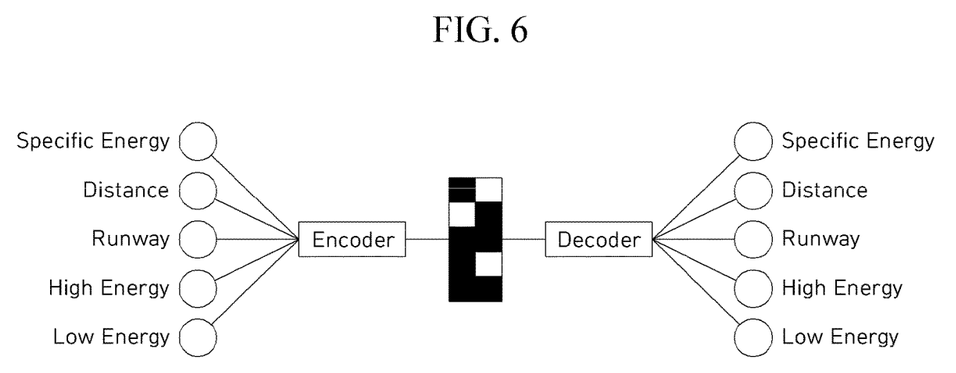
FIGS. 6 and 7 show an energy anomaly learning model combining an autoencoder and LSTM according to an embodiment of the present disclosure.
Figure 7:
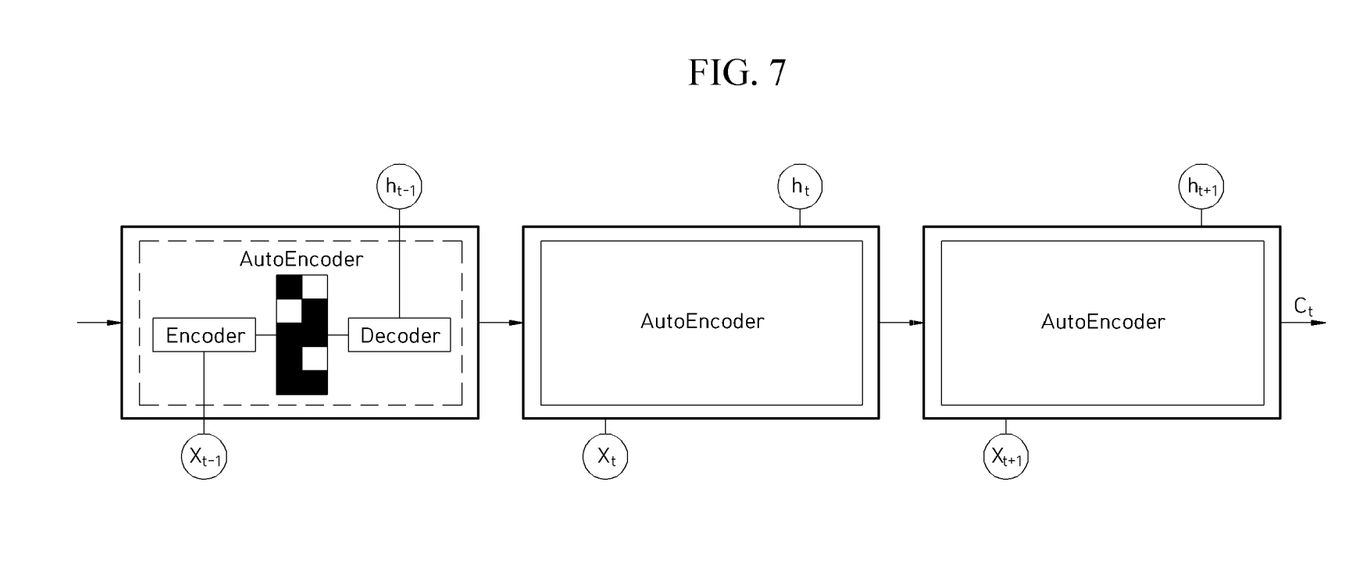

FIGS. 6 and 7 show an energy anomaly learning model combining an autoencoder and LSTM according to an embodiment of the present disclosure.

The energy anomaly learning model according to an embodiment of the present disclosure analyzes the energy state at each point of ADS-B, which is time series data, and uses the analyzed result as an input of LSTM, which is a time series learning model, to predict the energy state at the next time point.

The autoencoder is an unsupervised learning model, which detects outliers by learning in a given state only with data input values. As shown in FIG. 6, the input of the autoencoder becomes an energy state value (high energy, low energy, normal) using the specific energy value in the data at a certain time point of ADS-B, and it is learned to output the same value due to the nature of the autoencoder model. If an energy value is given as test data to the learned model, it can be predicted whether the energy state is normal or abnormal (high energy, low energy) for the corresponding runway and the remaining distance class.

A learning model such as an autoencoder can be used to determine whether there is an outlier in data in a specific state, but it has limitations in predicting time series data. Therefore, according to an embodiment of the present disclosure, to address this issue, long short-term memory (LSTM) is used, which is a deep learning-based artificial intelligence network learning model widely used for predicting time-series data.

According to an embodiment of the present disclosure, information of the past is utilized for learning at the present time by using a scheme like a chain that transfers information of a previous step to a neural network of the next step.

According to an embodiment of the present disclosure, by a structure that transfers the energy value and energy state, which are the output results of the autoencoder, to the input of the next step, as shown in FIG. 7, at a certain time point of ADS-B data, the autoencoder result of the previous time point is transferred to the autoencoder as an input along with ADS-B data at the current time point. This process is performed repeatedly to continuously predict the energy state.

Figure 8:
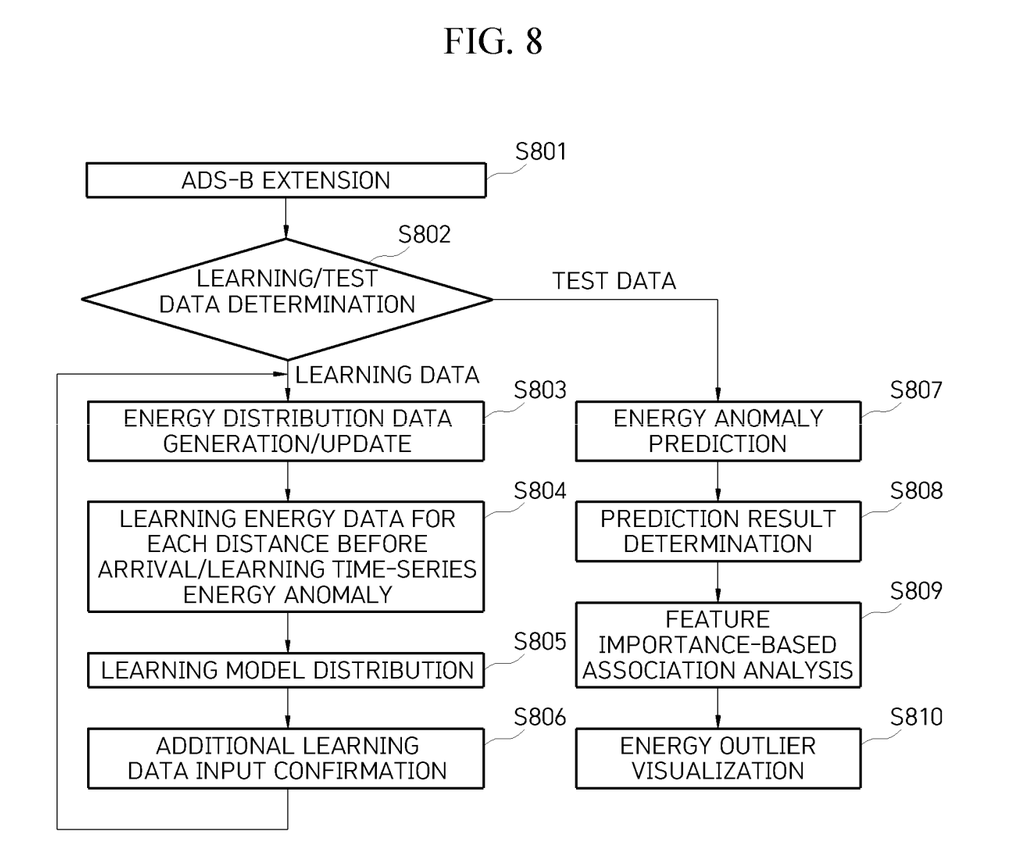
FIG. 8 shows an aircraft energy anomaly detection method using an artificial neural network learning model according to an embodiment of the present disclosure.

FIG. 8 shows an aircraft energy anomaly detection method using an artificial neural network learning model according to an embodiment of the present disclosure.

The aircraft energy anomaly detection method using an artificial neural network learning model according to an embodiment of the present disclosure includes (a) generating a specific energy feature for energy state analysis by extending ADS-B data; and (b) generating an energy distribution model by the use of the specific energy feature, and performing artificial neural network-based energy anomaly learning.

The step (a) includes extracting the specific energy feature by the use of location information and motion information of the ADS-B data.

The step (a) includes managing energy distribution data for each arrival airport runway.

The step (a) includes predicting an arrival runway by the use of runway heading information and latitude and longitude information of the runway threshold of the arrival airport.

The step (b) includes learning energy data for each distance class of the runway, wherein time-series energy anomaly learning is performed by the use of the autoencoder learning result for each distance class to the runway as an input to an LSTM model.

The method for detecting an aircraft energy anomaly using an artificial neural network learning model according to the present disclosure further includes (c) predicting whether or not there is an aircraft energy anomaly in real time by the use of test data and a learning model which has been trained and distributed in the step (b).

The step (c) includes predicting an energy anomaly by the use of a hybrid model in which an autoencoder and an LSTM are combined.

Referring to FIG. 8, in step S801, additional features for energy state analysis are generated by extending the ADS-B data which is simple time series-based track information. The ADS-B data is extended by linking weather information, which is related external information, including specific energy information required for energy state analysis, to identify the importance of features in prediction analysis. In step S802, the extended data is classified into test data and training data for validation of the learning model. Learning is performed on the training data.

In step S803, energy distribution data for each runway of the arrival airport is generated using the extended training data. Energy state analysis is performed for each distance class to the runway in units of 0.5 nautical miles, and the remaining distance class to the runway is calculated by the use of the location information of the data. In step S803, the energy distribution for each distance class of the arrival airport runway for all training data is calculated, wherein the energy distribution value is changed as data is accumulated, and the energy distribution data is updated whenever additional data is inputted. The energy distribution value is utilized as ground truth data by the use of the IQR technique, so that high energy and low energy can be discerned from each other.

In step S804, the extended training data learns energy data by the use of an autoencoder for each distance class to the runway. As described above with reference to FIGS. 6 and 7, the autoencoder learning model result for each runway distance becomes an input of an LSTM model for time-series energy anomaly learning. In step S805, the trained learning model is distributed for the prediction by the use of test data. In step S806, it is determined whether to input additional learning data, and when new training data is additionally introduced, the above-described processes are repeated similarly to change the learning model, and the changed model is automatically distributed as a prediction model.

In step S807, when test data is given as an input to the learning model, an energy anomaly is predicted by the use of a hybrid model in which an autoencoder and an LSTM are combined.

In step S808, in the case of a test dataset, performance is analyzed by comparing the ground truth data results with the prediction results.

In step S809, in the case of training and testing, the importance of each data feature with respect to the prediction result in the learning model is obtained. That is, by extracting the influence on the prediction result for each feature, important variables are identified and utilized for correlation analysis of data. These feature importance results can be visualized in the form of a graph.

In step S810, the energy outlier detection result, that is, the energy state analysis result is visualized and provided in a form similar to that of FIG. 2 described above.

Figure 9:
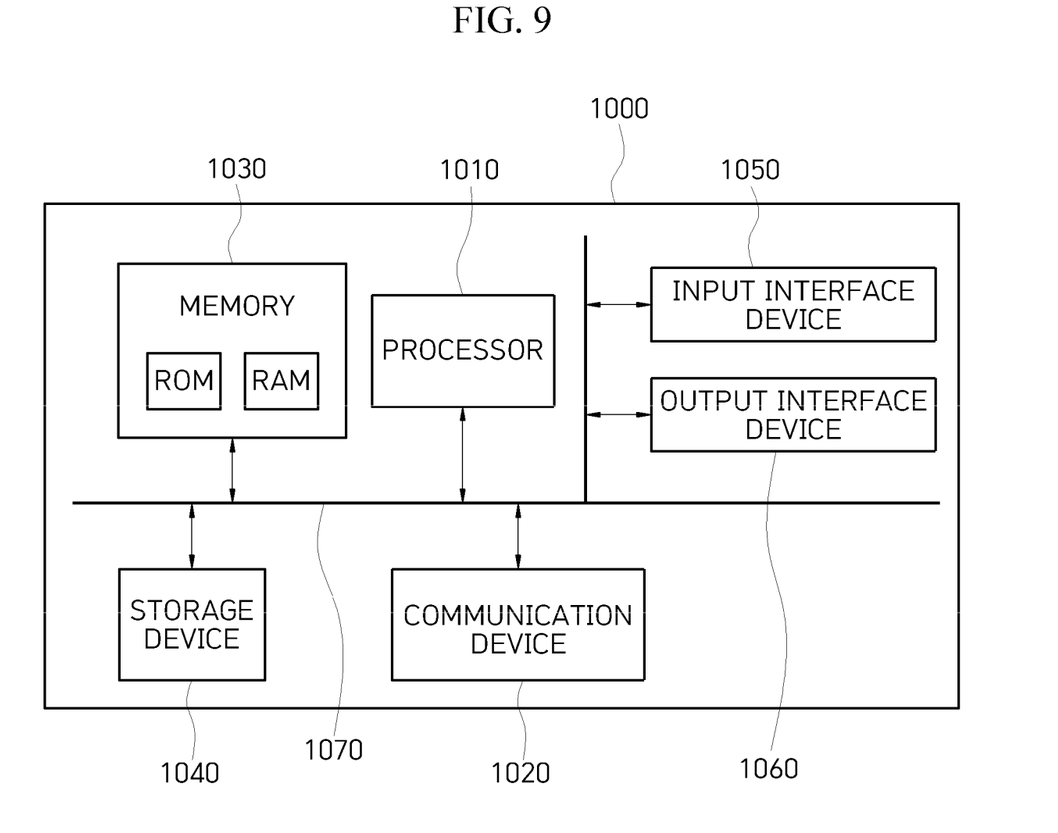
FIG. 9 is a block diagram representing a computer system for implementing a method according to an embodiment of the present disclosure.

FIG. 9 is a block diagram representing a computer system for implementing a method according to an embodiment of the present disclosure.

The aircraft energy anomaly detection system using an artificial neural network learning model according to an embodiment of the present disclosure includes an input interface device 1050 for receiving ADS-B (Automatic Dependent Surveillance-Broadcast) data; a memory 1030 storing a program which generates a specific energy feature for energy state analysis by extending the ADS-B data through a preprocessing; and a processor 1010 for executing the program, wherein the processor 1010 generates an energy distribution model by the use of the specific energy feature, and performs artificial neural network-based energy anomaly learning.

The processor 1010 extracts the specific energy feature by the use of location information and motion information of the ADS-B data, and generates the energy distribution model.

The processor 1010 manages energy distribution data for each arrival airport runway.

The processor 1010 predicts an arrival runway by the use of runway heading information and latitude and longitude information of the runway threshold of the arrival airport.

The processor 1010 predicts whether an aircraft energy anomaly exists in real time by the use of the trained learning model and test data.

The processor 1010 calculates a specific energy value at a certain point of the ADS-B data of a flight which has arrived at the corresponding runway for the remaining distance to the runway to generate a quantile value, and determines the energy state of a certain flight by comparing it with a quantile model of the runway of the arrival airport.

The processor 1010 analyzes the energy state at the point of the ADS-B data, which is time series data, and uses the analysis result as an input of the LSTM to predict the energy state at the next time point.

Referring to FIG. 9, the computer system 1000 may include one or more of the processor 1010, the memory 1030, the input interface device 1050, the output interface device 1060, and the storage device 1040, which communicate to each other through a bus 1070. The computer system 1000 may also include a communication device 1020 coupled to a network. The processor 1010 may be a central processing unit (CPU) or a semiconductor device that executes instructions stored in the memory 1030 or the storage device 1040. The memory 1030 and the storage device 1040 may include various types of volatile or non-volatile storage media. For example, the memory may include a read only memory (ROM) and a random access memory (RAM). In an embodiment of the present disclosure, the memory may be located inside or outside the processor, and the memory may be connected to the processor through various known means. The memory may include various forms of volatile or non-volatile storage media. For example, the memory may include a read-only memory (ROM) or a random access memory (RAM).

Accordingly, an embodiment of the disclosure may be implemented as a computer implemented method or as a non-transitory computer readable medium with computer executable instructions stored thereon. In one embodiment, when executed by a processor, the computer readable instructions may perform a method according to at least one aspect of the present disclosure.

The communication device 1020 may transmit or receive a wired signal or a wireless signal.

Additionally, the method according to the embodiment of the present disclosure may be implemented in the form of program instructions that can be executed through various computer means, and thus may be recorded on a computer readable medium.

The computer readable medium may include program instructions, data files, data structures, and the like alone or in combination with each other. The program instructions recorded on the computer readable medium may be what is specially designed and configured for the embodiments of the present disclosure, or may be what is known to and usable by those skilled in the art in the field of computer software. The computer-readable recording medium may include a hardware device configured to store and execute program instructions. For example, the computer-readable recording media may be magnetic media such as hard disks, floppy disks and magnetic tapes, optical media such as CD-ROMs and DVDs, magneto-optical media such as floptical disks, ROMs, RAMS, flash memories, or the like. The program instructions may include high-level language codes that can be executed by a computer through an interpreter or the like as well as machine language codes generated by a compiler.

While the embodiments of the present disclosure have been described in detail above, the scope of the patent right of the present disclosure is not limited thereto, but various modifications and improvements which could be made by those skilled in the art using the basic concept of the present disclosure defined in the following claims would also fall within the scope of the patent right of the present disclosure.

What is claimed is:

1. A system for detecting an aircraft energy anomaly using an artificial neural network learning model, the system comprising:
   an input interface device for receiving ADS-B (Automatic Dependent Surveillance-Broadcast) data;
   a memory storing a program which generates a specific energy feature for energy state analysis by extending the ADS-B data through a preprocessing; and
   a processor for executing the program,
   wherein the specific energy feature relates to whether aircraft energy is too high or too low during an approach stage of an aircraft to a runway, and
   wherein the processor generates an energy distribution model by the use of the specific energy feature, and performs artificial neural network-based energy anomaly learning.

2. The system of claim 1, wherein the processor extracts the specific energy feature by the use of location information and motion information of the ADS-B data, and generates the energy distribution model.

3. The system of claim 2, wherein the processor manages energy distribution data for each arrival airport runway.

4. The system of claim 3, wherein the processor predicts an arrival runway by the use of runway heading information and latitude and longitude information of the runway threshold of the arrival airport.

5. The system of claim 1, wherein the processor predicts whether an aircraft energy anomaly exists in real time by the use of a trained learning model and test data.

6. The system of claim 5, wherein the processor calculates a specific energy value at a certain point in the ADS-B data of a flight which has arrived at a corresponding runway, for a remaining distance to the corresponding runway to generate a quantile value, and determines an energy state of a certain flight by comparing the quantile value with a quantile model of a runway of an arrival airport.

7. The system of claim 5, wherein the processor analyzes an energy state at a point of the ADS-B data, which is time series data, and utilizes an analysis result as an input of a long short-term memory (LSTM) to predict an energy state at a next time point.

8. A method for detecting an aircraft energy anomaly using an artificial neural network learning model, the method comprising:
   (a) generating a specific energy feature for energy state analysis by extending ADS-B data; and (b) generating an energy distribution model by the use of the specific energy feature, and performing artificial neural network-based energy anomaly learning, wherein the specific energy feature relates to whether aircraft energy is too high or too low during an approach stage of an aircraft to a runway.

9. The method of claim 8, wherein the step (a) includes extracting the specific energy feature by the use of location information and motion information of the ADS-B data.

10. The method of claim 9, wherein the step (a) includes managing energy distribution data for each arrival airport runway.

11. The method of claim 10, wherein the step (a) includes predicting an arrival runway by the use of runway heading information and latitude and longitude information of the runway threshold of an arrival airport.

12. The method of claim 10, wherein the step (b) includes learning energy data for each distance class of a runway, wherein time-series energy anomaly learning is performed by the use of an autoencoder learning result for each distance class of a runway as an input to an LSTM model.

13. The method of claim 8, further comprising (c) predicting whether or not there is an aircraft energy anomaly in real time by the use of test data and a learning model which has been trained and distributed in the step (b).

14. The method of claim 13, wherein the step (c) includes predicting an energy anomaly by the use of a hybrid model in which an autoencoder and an LSTM are combined.

* * * * *